US012706494B2

(12) United States Patent
Ban et al.

(10) Patent No.: US 12,706,494 B2
(45) Date of Patent: Aug. 11, 2026

(54) ROTOR FOR ELECTRIC MOTOR

(71) Applicant: AISIN CORPORATION, Kariya (JP)

(72) Inventors: Mio Ban, Kariya (JP); Yasuhiro Kume, Kariya (JP); Makoto Tsukahara, Kariya (JP); Shoki Shimizu, Kariya (JP); Tsubasa Kobayashi, Kariya (JP)

(73) Assignee: AISIN CORPORATION, Kariya (JP)

( * ) Notice: Subject to any disclaimer, the term of this patent is extended or adjusted under 35 U.S.C. 154(b) by 280 days.

(21) Appl. No.: 18/279,311

(22) PCT Filed: May 24, 2022

(86) PCT No.: PCT/JP2022/021195
§ 371 (c)(1),
(2) Date: Aug. 29, 2023

(87) PCT Pub. No.: WO2022/250037
PCT Pub. Date: Dec. 1, 2022

(65) Prior Publication Data

US 2024/0171025 A1 May 23, 2024

(30) Foreign Application Priority Data

May 24, 2021 (JP) ................................ 2021-086785

(51) Int. Cl.
*H02K 1/27* (2022.01)
*H02K 1/02* (2006.01)
*H02K 1/278* (2022.01)

(52) U.S. Cl.
CPC ............... *H02K 1/278* (2013.01); *H02K 1/02* (2013.01)

(58) Field of Classification Search
CPC .......... H02K 1/278; H02K 1/02; H02K 1/276; H02K 2213/03
See application file for complete search history.

(56) References Cited

U.S. PATENT DOCUMENTS

2007/0103024 A1 5/2007 Nakayama et al.
2011/0127859 A1* 6/2011 Amrhein ................ H02K 1/276 310/43

(Continued)

FOREIGN PATENT DOCUMENTS

JP H01-166463 U 11/1989
JP H08-107640 A 4/1996

(Continued)

OTHER PUBLICATIONS

Sep. 6, 2024 Extended European Search Report issued in European Patent Application No. 22811307.2.

(Continued)

*Primary Examiner* — Thomas Truong
(74) *Attorney, Agent, or Firm* — Oliff PLC

(57) ABSTRACT

A rotor extends towards the central axis of an electric motor rotation and is rotatably supported about the central axis of rotation. The rotor includes: permanent magnets arranged in its outer peripheral portion wherein N-poles and S-poles are alternately formed in the circumferential toward the rotor in the outer peripheral portion of the rotor, the N-poles and the S-poles being magnetic poles extending parallel toward the central axis of rotation; an outer peripheral core located facing the permanent magnet outer peripheral surfaces intermediate portions, the same portions excluding both end portions toward the central axis of rotation; and two terminal cores located at each end of the rotor toward the central axis of rotation. The outer peripheral core and the terminal cores are made of a magnetic material, and the maximum magnetic permeability of the terminal cores is equal to or less than that of the outer peripheral core.

8 Claims, 11 Drawing Sheets

(56) References Cited

U.S. PATENT DOCUMENTS

| | | | | |
|---|---|---|---|---|
| 2017/0098970 | A1 | 4/2017 | Tsuchida et al. | |
| 2019/0372411 | A1 | 12/2019 | Ueda | |
| 2024/0088733 | A1* | 3/2024 | Yamada | H02K 1/28 |

FOREIGN PATENT DOCUMENTS

| | | | |
|---|---|---|---|
| JP | 2003-134705 | A | 5/2003 |
| JP | 2004-129369 | A | 4/2004 |
| JP | 2005-051826 | A | 2/2005 |
| JP | 2007-330027 | A | 12/2007 |
| JP | 2008-182824 | A | 8/2008 |
| JP | 2018-117488 | A | 7/2018 |
| WO | 2015/166532 | A1 | 11/2015 |

OTHER PUBLICATIONS

Aug. 9, 2022 Search Report issued in International Patent Application No. PCT/JP2022/021195.

* cited by examiner 30
31
32
31
32
31
32
31
32
40
41
21
22
22
21
22
21
11
10
PH1,
TH1
1
41
40
TH2

| ROTOR | X | Y1 | Y2 | Z1 | Z2 |
|---|---|---|---|---|---|
| STRUCTURE (STRUCTURE OF 1/8 OF ROTOR) | | | | | |
| MATERIAL OF TERMINAL CORES | – | 50A600 | DUST CORE | 50A600 | DUST CORE |
| MATERIAL OF BODY PORTIONS | – | 50A600 | 50A600 | 50A600 | 50A600 |
| MATERIAL OF CONNECTION PORTIONS | – | AIR GAP | AIR GAP | 50A600 | 50A600 |
| RATE OF IMPROVEMENT IN AVERAGE TORQUE (%) | – | 2.9 | 3.7 | −1.3 | −0.5 |
| DETERMINATION | – | ○ | ○ | × | × |

FIG. 9

| ROTOR | Y1a | Y1b | Y1c | Y1d | Y1e |
|---|---|---|---|---|---|
| STRUCTURE | | | | | |
| MATERIAL OF TERMINAL CORES | 50A600 | 50A600 | 50A600 | 50A600 | 50A600 |
| MATERIAL OF BODY PORTIONS | 50A600 | 50A600 | 50A600 | 50A600 | 50A600 |
| MATERIAL OF CONNECTION PORTIONS | air | AIR GAP | AIR GAP | AIR GAP | AIR GAP |
| RATE OF IMPROVEMENT IN AVERAGE TORQUE (%) | 1.9 | 3.6 | 1.1 | 3.5 | 5.8 |
| DETERMINATION | ○ | ○ | ○ | ○ | ○ |

FIG. 10

| ROTOR | Y2a | Y2b | YA | YB |
| --- | --- | --- | --- | --- |
| STRUCTURE | | | | |
| MATERIAL OF TERMINAL CORES | DUST CORE | DUST CORE | DUST CORE | 50A600 |
| MATERIAL OF BODY PORTIONS | 50A600 | 50A600 | 50A600 | 50A600 |
| MATERIAL OF CONNECTION PORTIONS | AIR GAP | AIR GAP | DUST CORE | AIR GAP AND 10% OF BODY PORTION NEXT TO EACH OTHER |
| RATE OF IMPROVEMENT IN AVERAGE TORQUE (%) | 2.7 | 4.3 | 0.9 | 2.5 |
| DETERMINATION | ○ | ○ | ○ | ○ |

FIG. 11

| ROTOR | YC | YD | YE | YF | YG |
|---|---|---|---|---|---|
| STRUCTURE | | | | | |
| MATERIAL OF TERMINAL CORES | 50A600 | 50A600 | DUST CORE | DUST CORE | DUST CORE |
| MATERIAL OF BODY PORTIONS | 50A600 | 50A600 | 50A600 | 50A600 | 50A600 |
| MATERIAL OF CONNECTION PORTIONS | AIR GAP | AIR GAP AND 10% OF BODY PORTION NEXT TO EACH OTHER | AIR GAP | DUST CORE | 50A600 |
| RATE OF IMPROVEMENT IN AVERAGE TORQUE (%) | 6.1 | 5.7 | 6.4 | 3.7 | 2.4 |
| DETERMINATION | ○ | ○ | ○ | ○ | ○ |

FIG. 12
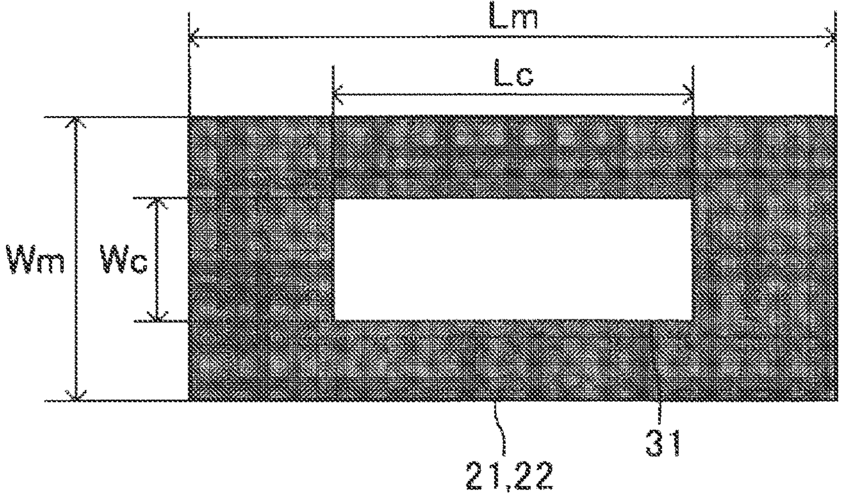
FIG. 13
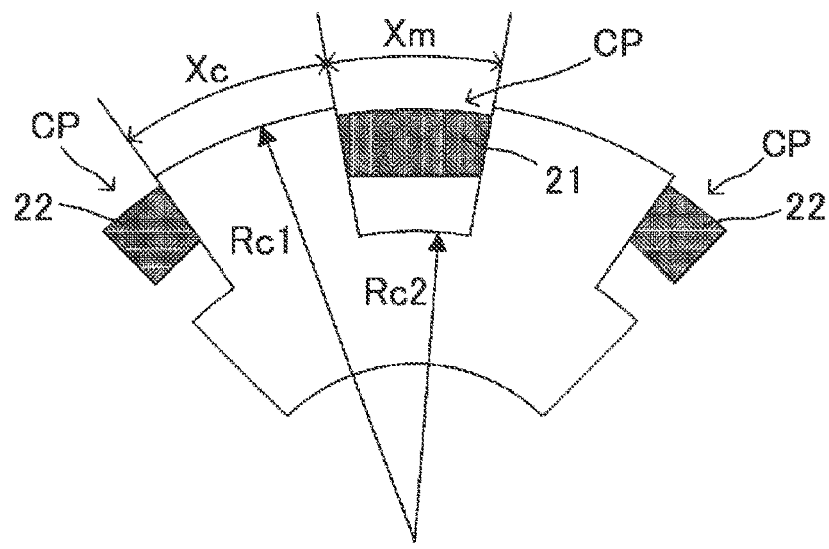
FIG. 14
| ROTOR | Lm(mm) | Lc(mm) | Wm(mm) | Wc(mm) |
|---|---|---|---|---|
| Y1a,Y2a | 25.2 | 14 | 7.7 | 4.71 |
| Y1b | 25.2 | 21 | 7.7 | 5.71 |
| Y1c | 25.2 | 6.93 | 7.7 | 6.71 |
| Y1d,Y2b | 25.2 | 14 | 7.7 | 7.71 |
| Y1e | 25.2 | 21 | 7.7 | 8.71 |
| ROTOR | Rc1(mm) | Rc2(mm) | Xc(°) | Xm(°) |
|---|---|---|---|---|
| YC～YG | 18.7 | 10.3 | 15 | 30 |

ROTOR FOR ELECTRIC MOTOR

TECHNICAL FIELD

The present disclosure relates to rotors for electric motors.

BACKGROUND ART

For example, Patent Documents 1 to 3 below describe a rotor for an electric motor (hereinafter simply referred to as "rotor"). The rotor includes a rotor core and a plurality of permanent magnets. The rotor core is a cylindrical member composed of a stack of substantially circular magnetic steel sheets (core pieces). The rotor core has a plurality of holes for housing (embedding) the plurality of permanent magnets therein. These holes extend through the rotor core from one end face to the other end face of the rotor core. These holes are located at equal intervals in the circumferential direction of the rotor core.

The permanent magnets are flat plate-like (rod-like) members extending parallel to the direction in which the central axis of rotation of the electric motor extends. The permanent magnets are magnetized in their thickness direction. That is, the front surface of each permanent magnet is an N-pole, and the back surface thereof is an S-pole. The permanent magnets are disposed in the holes of the rotor core. A plurality of magnetic poles (N-poles and S-poles) is thus formed at equal intervals in the circumferential direction of the rotor core. A plurality of air gaps (slits) for reducing leakage magnetic flux is formed at predetermined positions around each permanent magnet in the rotor core.

RELATED ART DOCUMENTS

Patent Documents

Patent Document 1: WO 2015/166532

Patent Document 2: Japanese Unexamined Patent Application Publication No. 2007-330027 (JP 2007-330027 A)

Patent Document 3: Japanese Unexamined Patent Application Publication No. 2018-117488 (JP 2018-117488 A)

SUMMARY OF THE DISCLOSURE

In the conventional rotors described above, the torque of the electric motor is improved by optimizing the positions of the permanent magnets, the number of permanent magnets, the positions of the air gaps (magnetic paths), etc.

It is an object of the present disclosure to provide a rotor capable of improving the average torque of an electric motor (average value of torque during one rotation of the rotor) over the conventional rotors.

In order to achieve the above object, a rotor for an electric motor according to the present disclosure extends in a direction of a central axis of rotation of the electric motor and is rotatably supported about the central axis of rotation. The rotor includes: a plurality of permanent magnets arranged in an outer peripheral portion of the rotor in such a manner that N-poles and S-poles are alternately located in a circumferential direction of the rotor, the N-poles and the S-poles being magnetic poles extending parallel to the direction of the central axis of rotation; an outer peripheral core located so as to face intermediate portions of outer peripheral surfaces of the permanent magnets, the intermediate portions being the outer peripheral surfaces of the permanent magnets excluding both end portions in the direction of the central axis of rotation; and a pair of terminal cores, the terminal cores each being located at a corresponding one of ends of the rotor in the direction of the central axis of rotation. The outer peripheral core and the terminal cores are made of a magnetic material, and maximum magnetic permeability of the terminal cores is equal to or less than maximum magnetic permeability of the outer peripheral core.

In the rotor for an electric motor according to one aspect of the present disclosure, adjacent portions of the outer peripheral core are connected to each other via a connection portion.

In the rotor for an electric motor according to another aspect of the present disclosure, maximum magnetic permeability of the connection portion is equal to or less than the maximum magnetic permeability of the outer peripheral core.

The rotor for an electric motor according to still another aspect of the present disclosure further includes a central core extending in the direction of the central axis of rotation and rotatably supported about the central axis of rotation. The plurality of permanent magnets is arranged on an outer peripheral surface of the central core, and the terminal cores of the pair of terminal cores are each arranged at a corresponding one of ends of the central core in the direction of the central axis of rotation.

In the rotor for an electric motor according to yet another aspect of the present disclosure, the terminal core has a positioning portion that defines positions of the plurality of permanent magnets in a circumferential direction of the outer peripheral portion of the rotor.

In the rotor of the present disclosure, the outer peripheral core that is a magnetic material is attached to the intermediate portions in a longitudinal direction of the permanent magnets. Therefore, magnetic flux is concentrated on the intermediate portions in a longitudinal direction of an outer peripheral surface of the rotor. Hereinafter, this magnetic flux will be referred to as "first magnetic flux." In other words, magnetic flux leakage toward both end faces in the longitudinal direction of the rotor is reduced. There is also magnetic flux flowing from the permanent magnets toward both ends of the rotor (leakage magnetic flux (hereinafter referred to as "second magnetic flux")), but this magnetic flux is concentrated on (short-circuited to) the terminal cores that are a magnetic material. That is, the second magnetic flux does not tend to flow in the circumferential direction of the rotor but tends to flow in a radial direction of the rotor.

In the electric motor to which the rotor according to the present disclosure is applied, first torque generated in the rotor due to the first magnetic flux and second torque generated in the rotor due to the second magnetic flux change in different manners. Specifically, the second torque increases while the first torque is decreasing, and the second torque decreases while the first torque is increasing. Therefore, in the electric motor using the rotor according to the present disclosure, fluctuations in torque generated in the rotor (total of the first torque and the second torque) are small, and average torque is improved compared to electric motors using the conventional rotors.

BRIEF DESCRIPTION OF THE DRAWINGS

FIG. 8 is a first table showing the rates of improvement in average torque of electric motors using rotors of the present disclosure.

FIG. 9 is a second table showing the rates of improvement in average torque of electric motors using rotors of the present disclosure.

FIG. 10 is a third table showing the rates of improvement in average torque of electric motors using rotors of the present disclosure.

FIG. 11 is a fourth table showing the rates of improvement in average torque of electric motors using rotors of the present disclosure.

FIG. 12 is a front view illustrating the positional relationship between a permanent magnet and an outer peripheral core (body portion).

FIG. 13 is a front view illustrating an example in which notches are cut in an outer peripheral portion of the terminal core.

FIG. 14 is a table showing dimensions of each portion.

MODES FOR CARRYING OUT THE DISCLOSURE (Overview) Hereinafter, a "rotor 1 for an electric motor" (hereinafter simply referred to as "rotor 1") according to an embodiment of the present disclosure will be described. The configuration of the electric motor to which the rotor 1 is applied will first be briefly described. The electric motor includes a stator. The stator is a cylindrical component. The stator has a plurality of teeth formed in its inner peripheral surface. These teeth are located at equal intervals in the circumferential direction of the stator. Coils are attached to each tooth. That is, electric wires are wound around each tooth.

The rotor 1 is a cylindrical component. The rotor 1 is housed inside the stator. The rotor 1 and the stator are disposed coaxially. The rotor 1 has a plurality of magnetic poles (N-poles and S-poles) extending parallel to the direction of the central axis of rotation of the rotor 1. These magnetic poles are arranged at equal intervals in the circumferential direction of the rotor 1. In the present embodiment, the rotor 1 has eight magnetic poles (four N-poles and four S-poles). These N-poles and S-poles are alternately arranged in the circumferential direction of the rotor 1. Power is supplied to the plurality of coils of the stator in a predetermined order. The rotor 1 is thus rotated with respect to the stator.

Figure 1:
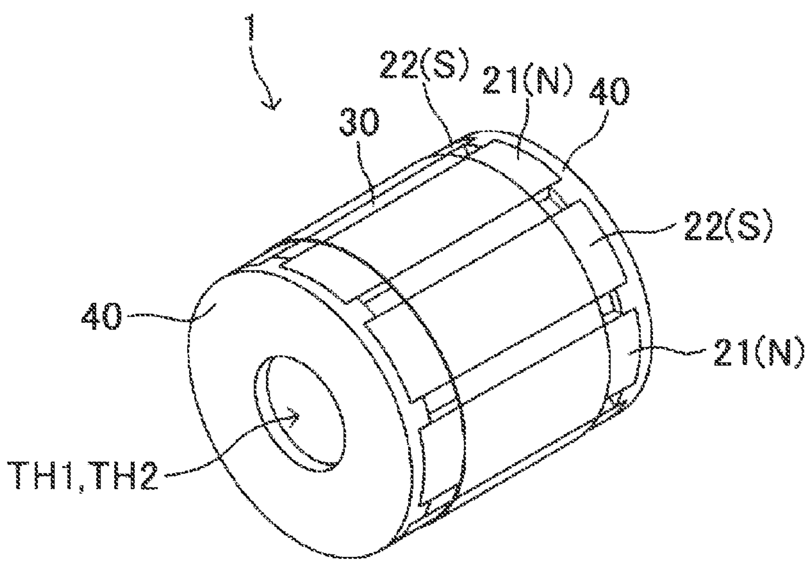
FIG. 1 is a perspective view of a rotor according to an embodiment of the present disclosure.

(Configuration) Next, the configuration of the rotor 1 will be described. As shown in FIG. 1, the rotor 1 includes a central core 10, a plurality of permanent magnets 20 (four permanent magnets 21 and four permanent magnets 22), an outer peripheral core 30, and a pair of terminal cores 40, 40.

Figure 2:
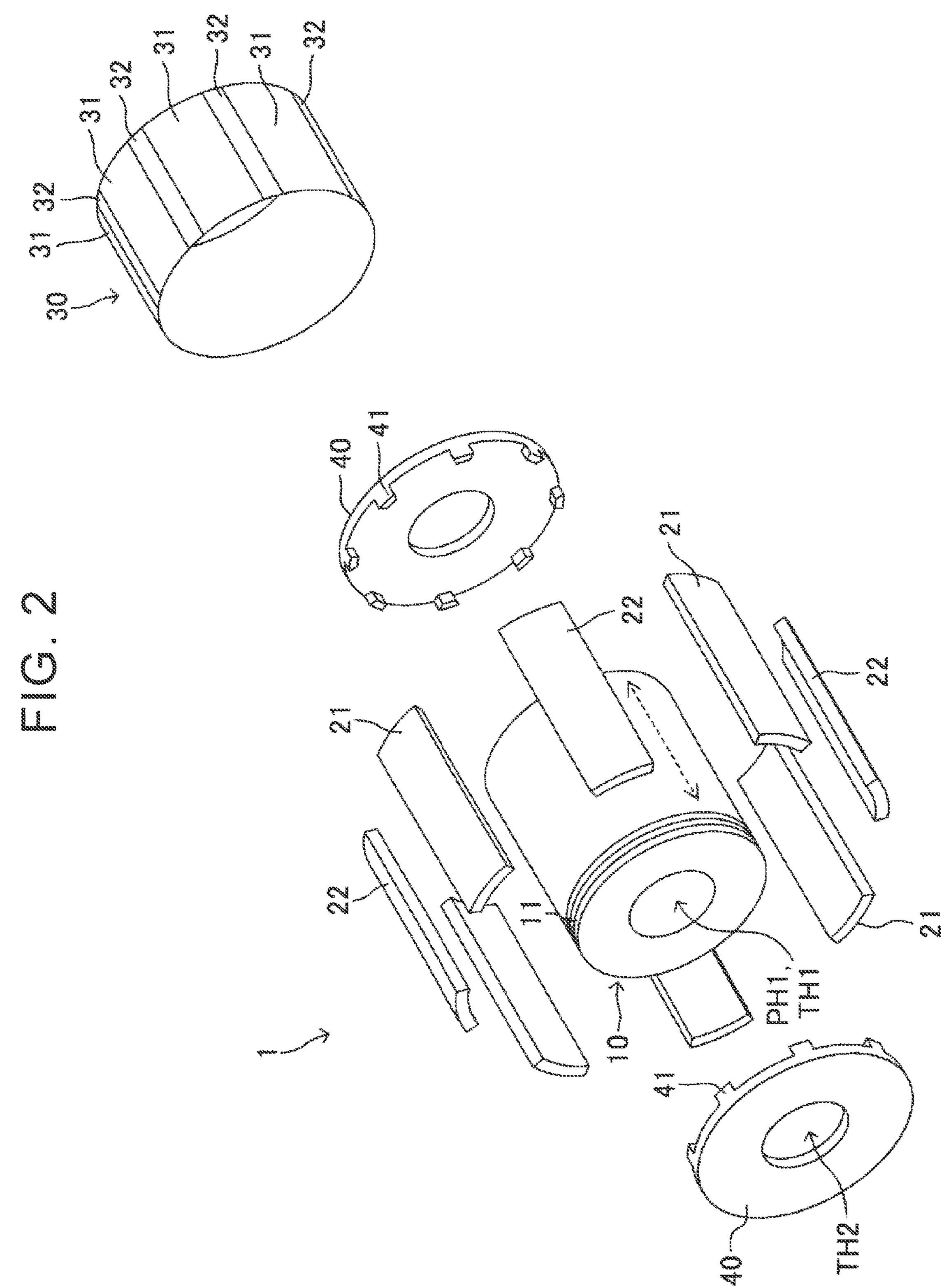
FIG. 2 is an exploded perspective view of the rotor of FIG. 1.

As shown in FIG. 2, the central core 10 is a cylindrical component. The central core 10 is a stack of a plurality of disc-shaped core pieces 11. Each core piece 11 is formed by blanking an electrical steel sheet (base material).

Each core piece 11 has a punched hole PH1 in its central portion. The punched hole PH1 has a circular shape. The punched holes PH1 communicate with each other in the stack of the core pieces 11. That is, the central core 10 has in its central portion a through hole TH1 extending through the central core 10 from one end face to the other end face in the longitudinal direction (direction in which the central axis extends) of the central core 10. A shaft (output shaft of the electric motor), not shown, is inserted and fixed in the through hole TH1.

The permanent magnets 20 are narrow plate-like components extending parallel to the direction in which the central axis (central axis of rotation) of the central core 10 extends. The permanent magnets 20 are curved so as to conform to the outer peripheral surface of the central core 10. That is, one surface in the thickness direction of each permanent magnet 20 is a convex surface, and the other surface thereof is a concave surface. The permanent magnets 20 are magnetized in their thickness direction. That is, the convex surface side of each permanent magnet 21 is an N-pole, and the concave surface side thereof is an S-pole. On the other hand, the convex surface side of each permanent magnet 22 is an S-pole, and the concave surface side thereof is an N-pole. The permanent magnets 21 and the permanent magnets 22 are alternately arranged in the circumferential direction of the central core 10 on the outer peripheral surface of the central core 10. The eight magnetic poles (four N-poles and four S-poles) as described above are thus arranged on the outer peripheral surface of the central core 10.

Figure 3:
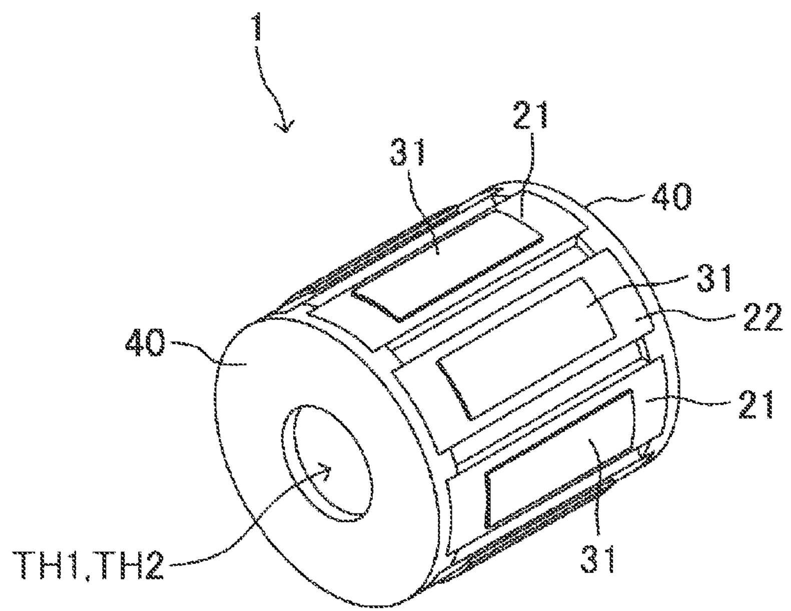
FIG. 3 is a perspective view of a rotor according to a modification of the present disclosure.
Figure 4:
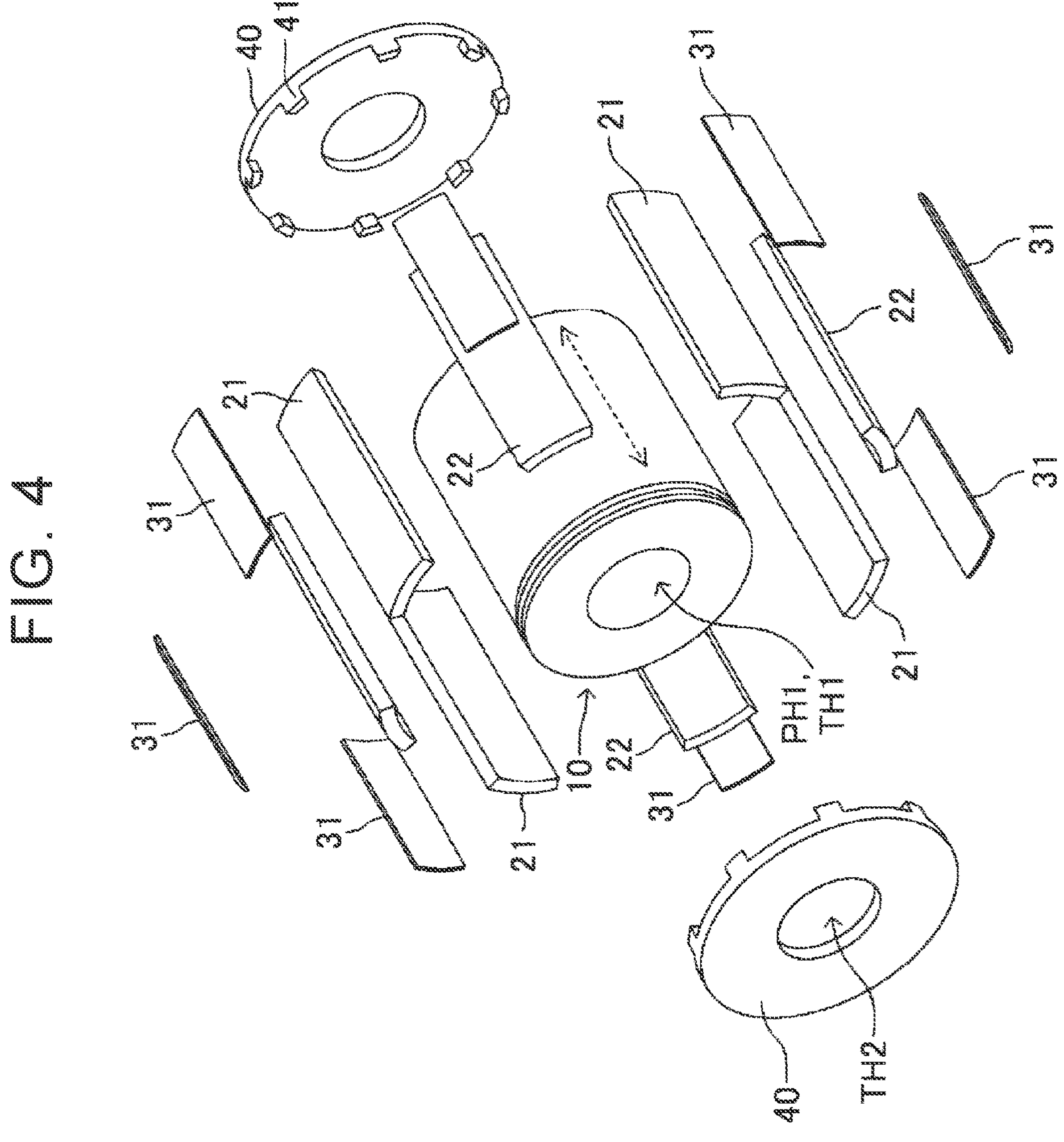
FIG. 4 is an exploded perspective view of the rotor of FIG. 3.

The outer peripheral core 30 has a plurality of plate-like body portions 31 arranged so as to face the surfaces (convex surfaces) of the permanent magnets 21, 22 and connection portions 32 each connecting adjacent body portions 31, 31. The body portions 31 are made of a magnetic material, and the connection portions 32 are made of a non-magnetic material. The body portions 31 are made of, for example, the same electrical steel sheets as those of the central core 10. The connection portions 32 are made of, for example, a synthetic resin material (e.g., polyphenylene sulfide resin material). The body portions 31 extend parallel to the central axis of the central core 10. The length Lc of the body portions 31 is smaller than the length Lm of the permanent magnets 21, 22 (see FIG. 12). The width We of the body portions 31 is narrower than the width Wm of the permanent magnets 21, 22. The body portions 31 are curved so as to conform to the convex surfaces of the permanent magnets 21, 22. The body portions 31 are arranged (bonded) so as to face the central portions of the permanent magnets 21, 22. That is, the intermediate portions in the longitudinal direction of the permanent magnets 21, 22 are covered with the outer peripheral core 30, and both end portions in the longitudinal direction of the permanent magnets 21, 22 are exposed. In the above example, adjacent body portions 31 are connected via the connection portions 32. That is, the outer peripheral core 30 has the shape of a ring. The body portions 31 and the connection portions 32 are desirably formed as separate components and connected together. Alternatively, part of a ring-shaped component made of electrical steel sheets (portions corresponding to the connection portions 32) may be irradiated with laser light to modify the part to make the part non-magnetic. Alternatively, as shown in FIGS. 3 and 4, the connection portions 32 may be omitted, and the body portions 31 may be bonded to the surfaces of the permanent magnets 21, 22.

The terminal cores 40 are disc-shaped components. The outer diameter of the terminal cores 40 is larger than the outer diameter of the central core 10. Each terminal core 40 has a through hole TH2 in its central portion. The inner diameter of the through hole TH2 is the same as the inner diameter of the through hole TH1. The terminal cores 40, 40 are attached to both end faces in the longitudinal direction of the central core 10. The terminal cores 40, 40 and the central core 10 are coaxially disposed.

A plurality of (eight) protrusions 41 is formed on the outer peripheral edge of one surface of each of the terminal cores 40, 40. These protrusions 41 are located at equal intervals in the circumferential direction of the terminal core 40. The terminal cores 40, 40 are bonded to both end faces of the central core 10 such that the protrusions 41 of one terminal core 40 face the protrusions 41 of the other terminal core 40. An end of each permanent magnet 21 (22) is disposed between two protrusions 41 adjacent to each other in the circumferential direction of the terminal core 40. That is, the protrusions 41 function as a positioning portion (anti-displacement portion) for the permanent magnets 21 (22).

Figure 5:
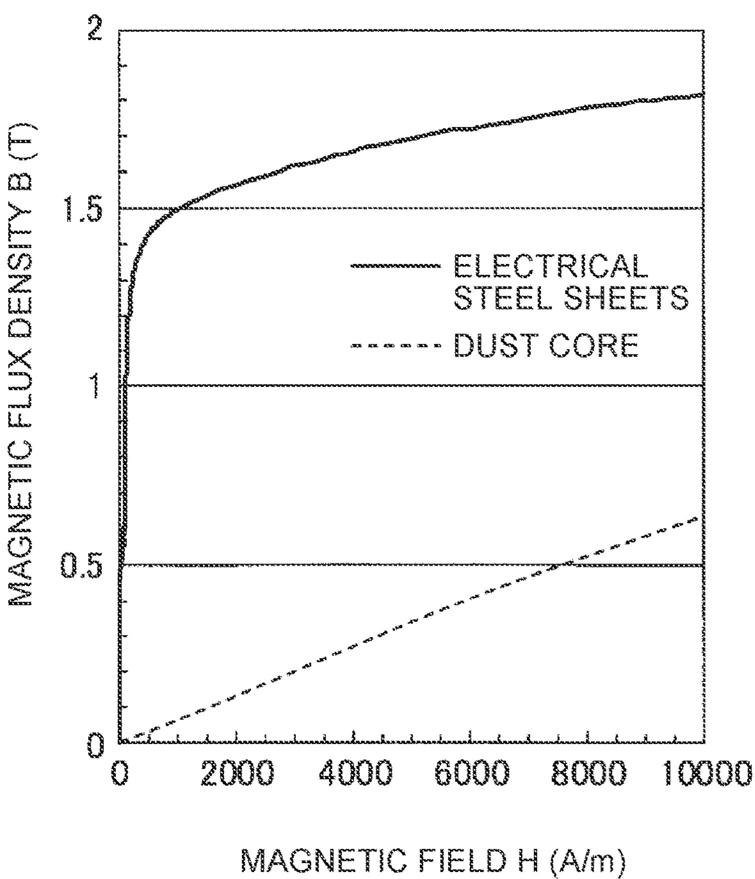
FIG. 5 is a graph showing an example of the relationship between the magnetic field applied to an electrical steel sheet and a dust core and the magnetic flux density.

Each terminal core 40 is a dust core (or made of electrical steel sheets). The maximum magnetic permeability of the terminal cores 40 is equal to or lower than the maximum magnetic permeability of the body portions 31 of the outer peripheral core 30 (maximum value of the slope of the graph representing the relationship between the magnetic field and the magnetic flux density shown in FIG. 5).

Figure 6:
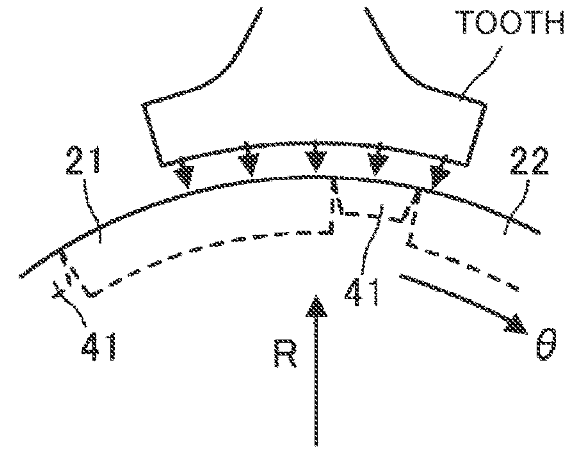
FIG. 6 is a diagram showing directions of magnetic lines of force in a terminal core.

(Functions and Effects) As described above, the body portions 31 of the outer peripheral core 30 that is a magnetic material are attached to the intermediate portions in the longitudinal direction of the permanent magnets 21, 22. Therefore, magnetic flux is concentrated on the intermediate portions in the longitudinal direction of the outer peripheral surface of the rotor 1. Hereinafter, this magnetic flux will be referred to as "first magnetic flux." In other words, magnetic flux leakage toward both end faces in the longitudinal direction of the rotor 1 is reduced. There is also magnetic flux flowing from the permanent magnets 21, 22 toward both ends of the rotor 1 (leakage magnetic flux (hereinafter referred to as "second magnetic flux")), but this magnetic flux is concentrated on (short-circuited to) the terminal cores 40, 40 that are a magnetic material. That is, as shown in FIG. 6, the second magnetic flux does not tend to flow in the circumferential direction θ of the rotor 1 but tends to flow in the radial direction R of the rotor 1 along the entire circumference of each terminal core 40.

Figure 7:
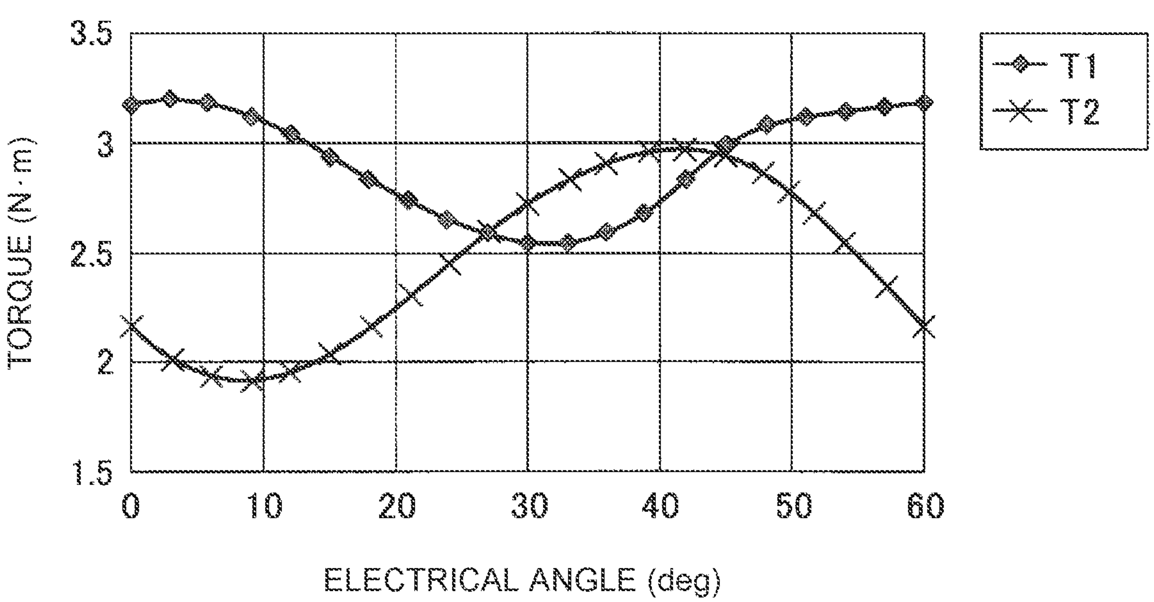
FIG. 7 is a graph showing torque fluctuations.

FIG. 7 shows the results of computer simulations of a change in first torque T1 generated in the rotor 1 due to the first magnetic flux and a change in second torque T2 generated in the rotor 1 due to the second magnetic flux (relationships between the rotation angle of the rotor 1 and each of the first torque T1 and the second torque T2) in the electric motor to which the rotor 1 is applied. As shown in this figure, the first torque T1 and the second torque T2 change in different manners. Specifically, the second torque T2 increases while the first torque T1 is decreasing, and the second torque T2 decreases while the first torque T1 is increasing. Such an action can be obtained by providing the protrusions 41 between the end of each permanent magnet 21 and the end of each permanent magnet 22. Therefore, in the electric motor using the rotor 1, fluctuations in torque generated in the rotor 1 (total of the first torque T1 and the second torque T2) are small, and the average torque Tm is improved compared to electric motors using the conventional rotors.

In the conventional rotors, it is necessary to align the positions of punched holes, slits, etc. when stacking the core pieces forming the rotor core. Since misalignment of these portions causes a reduction in torque of the electric motor, high manufacturing accuracy is required for rotor cores. On the other hand, in the present embodiment, the core pieces 11 forming the central core 10 have a simpler shape (number of punched holes) than the conventional core pieces. This makes it easy to manufacture the central core 10.

(Examples) Next, FIG. 8 shows the results of comparison between the average torque Tm of an electric motor using a conventional rotor X and the average torques Tm of electric motors using rotors Y1, Y2 according to examples of the present disclosure (rates of improvement in average torque Tm (results of computer simulations)). This figure also shows the results of comparison between the average torque Tm of the electric motor using the rotor X and the average torques Tm of electric motors using rotors Z1, Z2 according to comparative examples of the present disclosure.

Like the conventional rotors described above, the rotor X also has a rotor core that is a stack of electrical steel sheets. Permanent magnets are disposed in holes formed in the outer peripheral edge portion of the rotor core. "50A600" in JIS C 2552-1986 is used as the electrical steel sheets forming the rotor core of the rotor X.

In the outer peripheral cores 30 of the rotors Y1, Y2, adjacent body portions 31 are not connected via the connection portions 32, and the body portions 31 are bonded to the surfaces of the permanent magnets 21, 22. That is, there are air gaps between the permanent magnets 21, 22 (between and outside the magnetic poles). The terminal cores 40, 40 of the rotor Y1 are made of the same electrical steel sheets as those of the body portions 31. "50A600" is used as the electrical steel sheets forming the body portions 31 and the terminal cores 40 of the rotor Y1.

The terminal cores 40, 40 of the rotor Y2 are dust cores. That is, in the rotor Y1, the body portions 31 and the terminal cores 40 have the same maximum magnetic permeability. On the other hand, in the rotor Y2, the maximum magnetic permeability of the terminal cores 40 is lower than the maximum magnetic permeability of the body portions 31. "50A600" in JIS C 2552-1986 is used as the electrical steel sheets forming the body portions 31 of the rotor Y2. Each terminal core 40 of the rotor Y2 is an injection molded article (dust core) made of a polyphenylene sulfide resin material mixed with pure iron powder. The content (volume ratio) of the pure iron powder in this dust core is about 50%.

In the rotors Z1, Z2, the entire outer peripheral core 30 is made of electrical steel sheets ("50A600"). That is, not only the body portions 31 but also the connection portions 32 are made of electrical steel sheets ("50A600"). Each terminal core 40 of the rotor Z1 is made of electrical steel sheets ("50A600") like the rotor Y1, and each terminal core 40 of the rotor Z2 is a dust core like the rotor Y2.

As shown in this figure, the average torque Tm was able to be improved when the rotors Y1, Y2 were used in which the portions of the outer peripheral core 30 that are located between and outside the magnetic poles are a non-magnetic material and the maximum magnetic permeability of the terminal cores 40 is equal to or less than the maximum magnetic permeability of the body portions 31. Moreover, the average torque Tm was able to be more improved when the rotor Y2 in which the maximum magnetic permeability of the terminal cores 40 is lower than the maximum magnetic permeability of the body portions 31 was used than when the rotor Y1 in which the maximum magnetic permeability of the terminal cores 40 and the maximum magnetic permeability of the body portions 31 are the same was used. On the other hand, the average torque Tm could not be improved in the rotors Z1, Z2 in which the portions of the outer peripheral core 30 that are located between and outside the magnetic poles are a magnetic material.

Next, FIG. 9 shows the rates of improvement in average torque Tm when rotors Y1*a* to Y1*e* that are different in dimensions of the body portions 31 (length Lc and width We (see FIGS. 12 and 14)) were used. Like the rotor Y1 shown in FIG. 8, the body portions 31 and the terminal cores 40 of the rotors Y1*a* to Y1*e* are made of electrical steel sheets. The length Lc and width Wc of the body portions 31 and the length Lm and width Wm of the permanent magnets 21, 22 of the rotors Y2*a* to Y2*e* are as shown in FIG. 14. The portions of the outer peripheral cores 30 of the rotors Y1*a* to Y1*e* that are located between and outside the magnetic poles are air gaps.

Next, FIG. 10 shows the rates of improvement in average torque Tm when rotors Y2*a* and Y2*b* that are different in dimensions of the body portions 31 (length Lc and width Wc (see FIG. 14)) were used. Like the rotor Y2 shown in FIG. 8, the body portions 31 of the rotors Y2*a* and Y2*b* are made of electrical steel sheets, and the terminal cores 40 of the rotors Y2*a* and Y2*b* are dust cores. The length Lc and width Wc of the body portions 31 and the length Lm and width Wm of the permanent magnets 21, 22 of the rotors Y2*a* and Y2*b* are as shown in FIG. 14. The portions of the outer peripheral cores 30 of the rotors Y2*a* and Y2*b* that are located between and outside the magnetic poles are air gaps.

This figure also shows the rate of improvement in average torque Tm when a rotor YA was used in which the body portions 31 are made of electrical steel sheets, the terminal cores 40 are dust cores, and the connection portions 32 are the same dust core as the terminal cores 40. This figure further shows the rate of improvement in average torque Tm when a rotor YB was used in which the body portions 31 and the terminal cores 40 are made of electrical steel sheets and both ends in the longitudinal direction of the body portions 31 are connected by the connection portions 32 made of the same electrical steel sheets as the body portions 31. The length Lc and width Wc of the body portions 31 and the length Lm and width Wm of the permanent magnets 21, 22 of the rotors YA, YB are the same as those of the rotor Y2*b*.

In the above examples, the terminal cores 40 have the shape of a disc. However, as shown in FIG. 13, the terminal cores 40 may have arc-shaped notches CP at positions facing the end faces of the permanent magnets 21, 22. FIG. 11 shows the rates of improvement in average torque Tm when rotors YC to YG having such terminal cores 40 were used. The radius Rc2 and central angle Xm of the inner peripheral edge of each notch CP, the radius Rc1 of each terminal core 40, and the central angle Xc of each fan-shaped portion between adjacent notches CP are as shown in FIG. 14. The materials of the outer peripheral core 30 and terminal cores 40 of the rotor YC are the same as those of the rotor Y1*c*. The materials of the outer peripheral core 30 and terminal cores 40 of the rotor YD are the same as those of the rotor YB. The materials of the outer peripheral core 30 and terminal cores 40 of the rotor YE are the same as those of the rotor Y2*b*. The materials of the outer peripheral core 30 and terminal cores 40 of the rotor YF are the same as those of the rotor YA. The materials of the outer peripheral core 30 and terminal cores 40 of the rotor YG are the same as those of the rotor Z2.

As described above, optimizing the dimensions of the body portions 31 with respect to the dimensions of the permanent magnets 21, 22 can reduce ripples (amounts of fluctuation) of the first torque T1 and the second torque T2 and maximize the average torque Tm. In principle, it is preferable that the maximum magnetic permeability of the connection portions 32 be lower than the maximum magnetic permeability of the body portions 31. However, even if the body portions 31 and the connection portions 32 have the same maximum magnetic permeability, the average torque Tm may be improved depending on the shape of the terminal cores 40 (see the rotor YG in FIG. 11).

DESCRIPTION OF THE REFERENCE NUMERALS

1 . . . Rotor, 10 . . . Central Core, 21, 22 . . . Permanent Magnet, 30 . . . Outer Peripheral Core, 31 . . . Body Portion, 32 . . . Connection Portion, 40 . . . Terminal Core, 41 . . . Protrusion, CP . . . Notch (Positioning Portion), T1 . . . First Torque, T2 . . . Second Torque, Tm . . . Average Torque

The invention claimed is:

1. A rotor for an electric motor, the rotor extending in a direction of a central axis of rotation of the electric motor and being rotatably supported about the central axis of rotation, the rotor comprising:

a plurality of permanent magnets arranged in an outer peripheral portion of the rotor in such a manner that N-poles and S-poles are alternately located in a circumferential direction of the rotor, the N-poles and the S-poles being magnetic poles extending parallel to the direction of the central axis of rotation;

an outer peripheral core located so as to face intermediate portions of outer peripheral surfaces of the permanent magnets, the intermediate portions being the outer peripheral surfaces of the permanent magnets excluding both end portions in the direction of the central axis of rotation;

a pair of terminal cores, the terminal cores each being located at a corresponding one of ends of the rotor in the direction of the central axis of rotation, wherein the outer peripheral core and the terminal cores are made of a magnetic material, and maximum magnetic permeability of the terminal cores is equal to or less than maximum magnetic permeability of the outer peripheral core; and a central core extending in the direction of the central axis of rotation and rotatably supported about the central axis of rotation, wherein:

the central core, the outer peripheral core and the terminal cores are formed as separate components;

the plurality of permanent magnets is arranged on an outermost peripheral surface of the central core; and the pair of terminal cores includes a first terminal core and a second terminal core that are each arranged at a corresponding one of ends of the central core in the direction of the central axis of rotation and the central core extends from the first terminal core to the second terminal core.

2. The rotor for an electric motor according to claim 1, wherein adjacent portions of the outer peripheral core are connected to each other via a connection portion.

3. The rotor for an electric motor according to claim 2, wherein maximum magnetic permeability of the connection portion is equal to or less than the maximum magnetic permeability of the outer peripheral core.

4. The rotor for an electric motor according to claim 3, wherein the terminal core has a positioning portion that defines positions of the plurality of permanent magnets in a circumferential direction of the outer peripheral portion of the rotor.

5. The rotor for an electric motor according to claim 2, wherein the terminal core has a positioning portion that defines positions of the plurality of permanent magnets in a circumferential direction of the outer peripheral portion of the rotor.

6. The rotor for an electric motor according to claim 1, wherein the terminal core has a positioning portion that defines positions of the plurality of permanent magnets in a circumferential direction of the outer peripheral portion of the rotor.

7. The rotor for an electric motor according to claim 1, wherein:

a first magnetic flux is formed in the intermediate portions in a longitudinal direction of an outer circumferential surface of the rotor by an action of the outer peripheral core, a second magnetic flux directed in a radial direction of the rotor is formed by an action of the terminal cores, and a maximum magnetic permeability of the terminal cores is set to be equal to or less than a maximum magnetic permeability of the outer peripheral core such that a second torque generated by an action of the second magnetic flux decreases in a process in which the rotor rotates during operation of the electric motor and a first torque generated by an action of the first magnetic flux increases.

8. A rotor for an electric motor, the rotor extending in a direction of a central axis of rotation of the electric motor and being rotatably supported about the central axis of rotation, the rotor comprising:

a plurality of permanent magnets arranged in an outer peripheral portion of the rotor in such a manner that N-poles and S-poles are alternately located in a circumferential direction of the rotor, the N-poles and the S-poles being magnetic poles extending parallel to the direction of the central axis of rotation;

an outer peripheral core located so as to face intermediate portions of outer peripheral surfaces of the permanent magnets, the intermediate portions being the outer peripheral surfaces of the permanent magnets excluding both end portions in the direction of the central axis of rotation;

a pair of terminal cores, the terminal cores each being located at a corresponding one of ends of the rotor in the direction of the central axis of rotation, wherein:

the outer peripheral core and the terminal cores are made of a magnetic material, a first magnetic flux is formed in the intermediate portions in a longitudinal direction of an outer circumferential surface of the rotor by an action of the outer peripheral core, a second magnetic flux directed in a radial direction of the rotor is formed by an action of the terminal cores, and a maximum magnetic permeability of the terminal cores is set to be equal to or less than a maximum magnetic permeability of the outer peripheral core such that a second torque generated by an action of the second magnetic flux decreases in a process in which the rotor rotates during operation of the electric motor and a first torque generated by an action of the first magnetic flux increases.

* * * * *